United States Patent [19]

Manookian, Jr.

[11] Patent Number: 5,586,996
[45] Date of Patent: Dec. 24, 1996

[54] VAPOR SEPARATING DEVICE

[76] Inventor: Arman K. Manookian, Jr., 2875 Terrell Ave., Oceanside, N.Y. 11572-1151

[21] Appl. No.: 241,600

[22] Filed: May 12, 1994

[51] Int. Cl.⁶ ................................................ B01D 19/00
[52] U.S. Cl. ............................ 55/321; 55/324; 55/325; 55/330; 55/DIG. 19; 96/190; 96/206; 123/573
[58] Field of Search ........................... 55/320, 321, 324, 55/325, 330, 385.3, DIG. 19; 96/190, 191, 206; 123/573

[56] References Cited

U.S. PATENT DOCUMENTS

| | | | |
|---|---|---|---|
| 581,912 | 5/1897 | Hunt | 55/330 |
| 3,201,924 | 8/1965 | Fulford et al. | 55/324 |
| 3,241,537 | 3/1966 | Jones | 55/320 |
| 3,408,828 | 11/1968 | Soumerai et al. | 55/320 |
| 3,654,748 | 4/1972 | Bloom | 55/330 |
| 3,796,025 | 3/1974 | Kasten | 55/330 |
| 4,136,650 | 1/1979 | Manookian, Jr. | 123/573 |
| 4,269,607 | 5/1981 | Walker | 55/330 |
| 4,409,950 | 10/1983 | Goldberg | 123/573 |
| 5,053,126 | 10/1991 | Krasnoff | 55/320 |
| 5,140,957 | 8/1992 | Walker | 55/DIG. 19 |

FOREIGN PATENT DOCUMENTS

| | | | |
|---|---|---|---|
| 196666 | 8/1957 | Austria | 55/330 |
| 990710 | 9/1951 | France | 55/330 |

*Primary Examiner*—C. Scott Bushey
*Attorney, Agent, or Firm*—Bauer & Schaffer

[57] ABSTRACT

In a device for separating oil from the blow-by exhaust vapors of a combustion engine, a filter stack is mounted in a canister having an inlet port for the intake of vapors from the engine, a gas outlet port for connection to a source of suction for causing the vapors to flow through the canister, and a discharge port communicating with a flow passage for removal of condensed oil. The filter stack is operatively arranged so that the vapors pass in contact with and through the filter stack. A plate partially surrounds the filter so that the oil in the vapors condense, and flow outwardly through the passage between the plate and the interior wall surface of the canister.

9 Claims, 4 Drawing Sheets

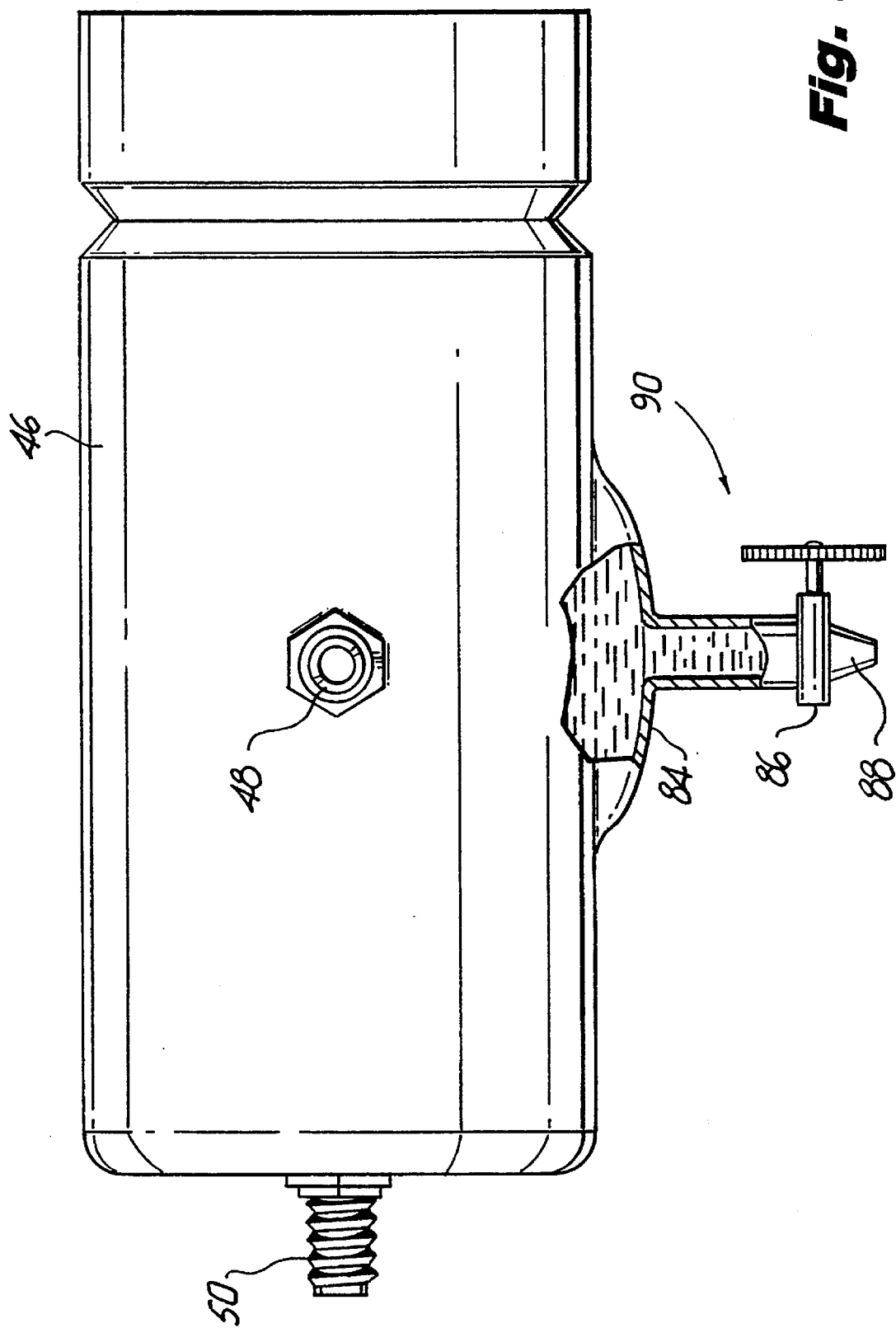

VAPOR SEPARATING DEVICE

FIELD OF THE INVENTION

The present invention relates to improvements in vapor separating devices and, more particularly, to a device for the separation from contaminated air of impurities, such as oil vapors, intermixed therewith prior to its use for combustion in an internal combustion-type engine.

BACKGROUND OF THE INVENTION

In an internal combustion-type engine, the carburetor mixes controlled quantities of filtered air and fuel and feeds the resultant mixture to the intake manifold, from which it is distributed to the cylinder for combustion. It has been recognized by those skilled in the art that during compression of the fuel-air mixture by the piston in a particular cylinder, certain quantities of blow-by vapors leak into the crankcase of the engine and become trapped therein with contaminants such as oil vapors emitted by heated engine-lubricating oil.

Modern automobile engines have been equipped with a positive crankcase ventilation (PCV) system which is disposed in a blow-by gas recirculation line connecting the crankcase and the intake manifold to recycle the contaminated blow-by vapors back into the combustion chamber. In such a system, a stream of fresh air is directed into the engine interior wherein it recirculates, picking up the vapor therein. The contaminated blow-by vapor then leaves the crankcase through a PCV valve and is conducted by conduit means to the intake manifold, wherein it mixes with the fuel-air mixture provided by the carburetor and is distributed to the cylinders for combustion.

It has also been recognized that the oil and other contaminants mixing with the blow-by vapors in the crankcase and, thereafter, reaching the intake manifold and combustion cylinders, has a number of undesirable effects on engine performance, including fouling of spark plugs through accumulation thereon of non-combustible residues, increased exhaust emissions due to the presence of unburned vapors, and decreased gas mileage as a result of incomplete combustion and the necessity of enriching the fuel-air mixture to off-set the loss of power therefrom.

In my earlier patent, U.S. Pat. No. 4,136,650 issued Jan. 30, 1979, I have provided a crankcase oil recovery system for separating oil from the recycled blow-by vapors. While this system is satisfactory, an improved, simpler, less costly system, as well as one which is more effective in separating oil, is desired.

SUMMARY OF THE INVENTION

In view of the aforementioned shortcomings, it is an object of the present invention to provide a device for the separation of impurities, such as oil, from crankcase ventilation vapors which is constructed of inexpensive, commercially available components, is easily installed on existing engines and has a higher separating efficiency than current available devices.

It is another object of the present invention to provide a separating and condensing device to recover oil from the blow-by vapors in the crankcase of an internal combustion-type engine and return the recovered oil to the crankcase.

Briefly stated, the present invention comprises an oil separating device for blow-by vapors intermixed with oil vapors in the crankcase of a combustion-type engine having an oil pan. The device comprises a canister having an inlet for blow-by vapor entrance and an outlet for blow-by vapor exit. A filter is located in the canister between the inlet and outlet such that contaminated blow-by vapors pass through the filter. The device also comprises means for collecting and/or removing at least some of the condensed oil separated from the contaminated blow-by gases the remainder being removed through the filter.

The filter is supported in a sleeve and mounted so as to provide an annular air passage between the sleeve and the inner wall of the canister. As the vapor enters the canister, the vapors hit the sleeve and the oil condenses thereon dropping to the bottom of the canister.

Full details of the present invention are set forth in the following detailed description of preferred embodiments of the invention, and will be better understood when read in conjunction with the appended drawings. For the purpose of illustrating the invention, there is shown in the drawings the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

BRIEF DESCRIPTION OF THE DRAWINGS

In the drawings:

FIG. 5 is an enlarged schematic view of another embodiment for drainage of the oil separator.

DETAILED DESCRIPTION OF PREFERRED EMBODIMENTS

While this invention is susceptible of embodiments in many different forms, this specification and the accompanying drawings disclose only some specific forms as examples of the use of the invention. The invention is not intended to be limited to the embodiments so described, and the scope of the invention will be pointed out in the appended claims.

Figure 1:
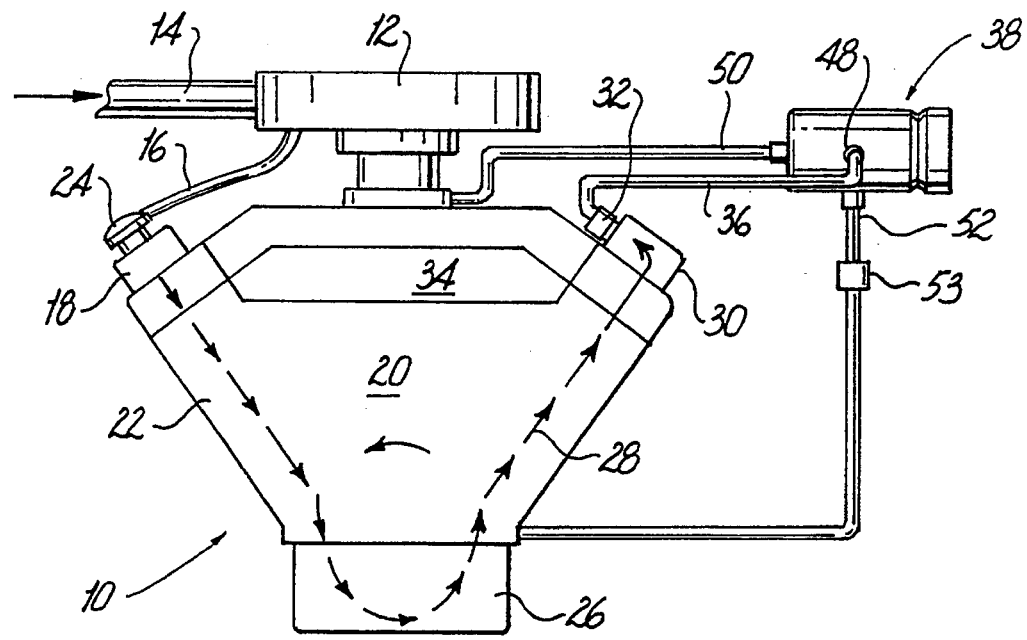
FIG. 1 is a schematic illustration of a typical V-type engine incorporating the oil separator of the present invention.

Referring now to the drawings in detail, wherein like numerals are used to indicate like elements throughout, there is shown in FIG. 1 a typical V-type gasoline-powered engine, generally designated 10, of the type shown in my aforementioned patent. Air flowing into the air filter 12 through the intake duct 14 is directed via a conduit 16 through an engine aperture 18 to the interior of a crankcase 20 in the engine block 22, passing first through an engine cleaner. An oil pan 26 at the bottom of the block holds a volume of lubricating oil that is circulated throughout the crankcase 20 as seen by the arrow 28.

As the engine 10 runs, the lubricating oil heats and emits oil vapors, which are trapped in the crankcase 20. Additionally, vapors consisting of an air-fuel mixture escape into the crankcase 20 from the combustion chambers, mixing therein with trapped oil vapors. As shown by the arrows 28 in FIG. 1, fresh air entering the crankcase 20 at aperture 18 circulates therein, mixing with the trapped vapors (this mixture hereinafter referred to as "blow-by vapors"), exiting engine block 22 at a discharge aperture 30, and passing thence through positive crankcase ventilating (PCV) valve 32. The direction of flow is defined by a vacuum present in the intake manifold 34 whenever the engine is running, which vacuum pulls the air through the engine 10. The blow-by vapors from crankcase 20 are channeled via a conduit 36 from PCV valve 32 to an oil separator, generally designated 38, for recovery and return to the engine, as further described below.

Figure 2:
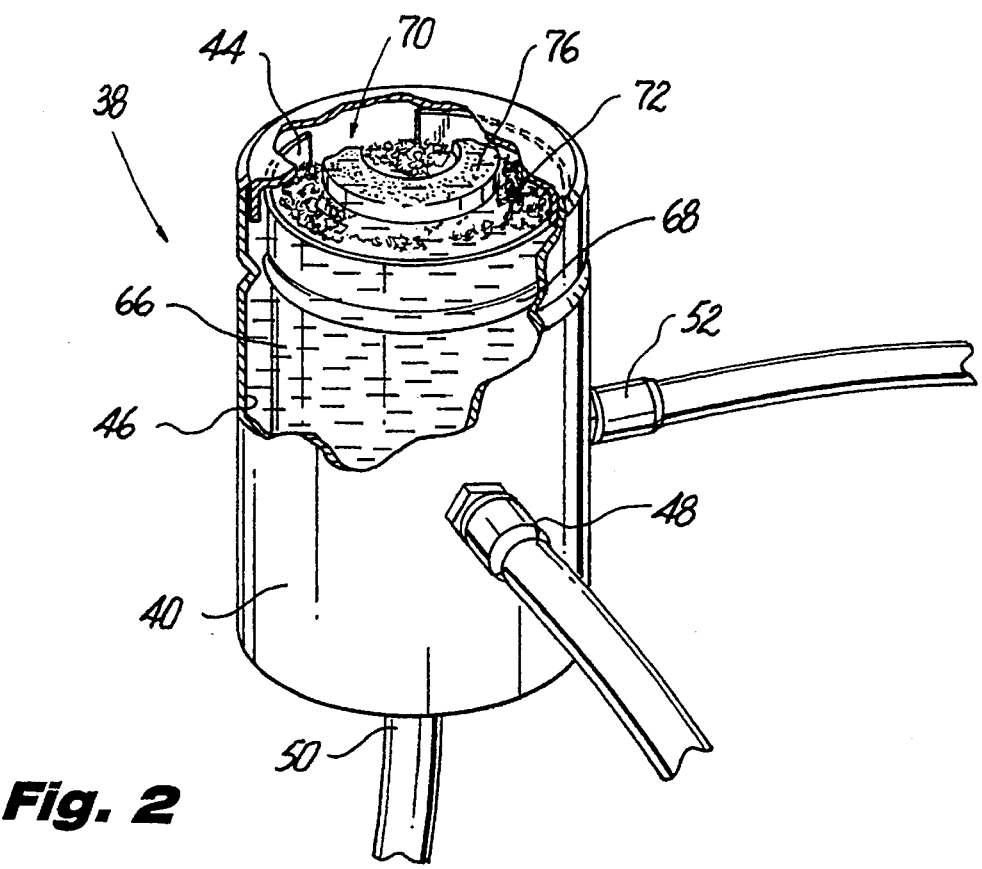
FIG. 2 is a perspective view partially broken to show the oil separator of the present invention.
Figure 3:
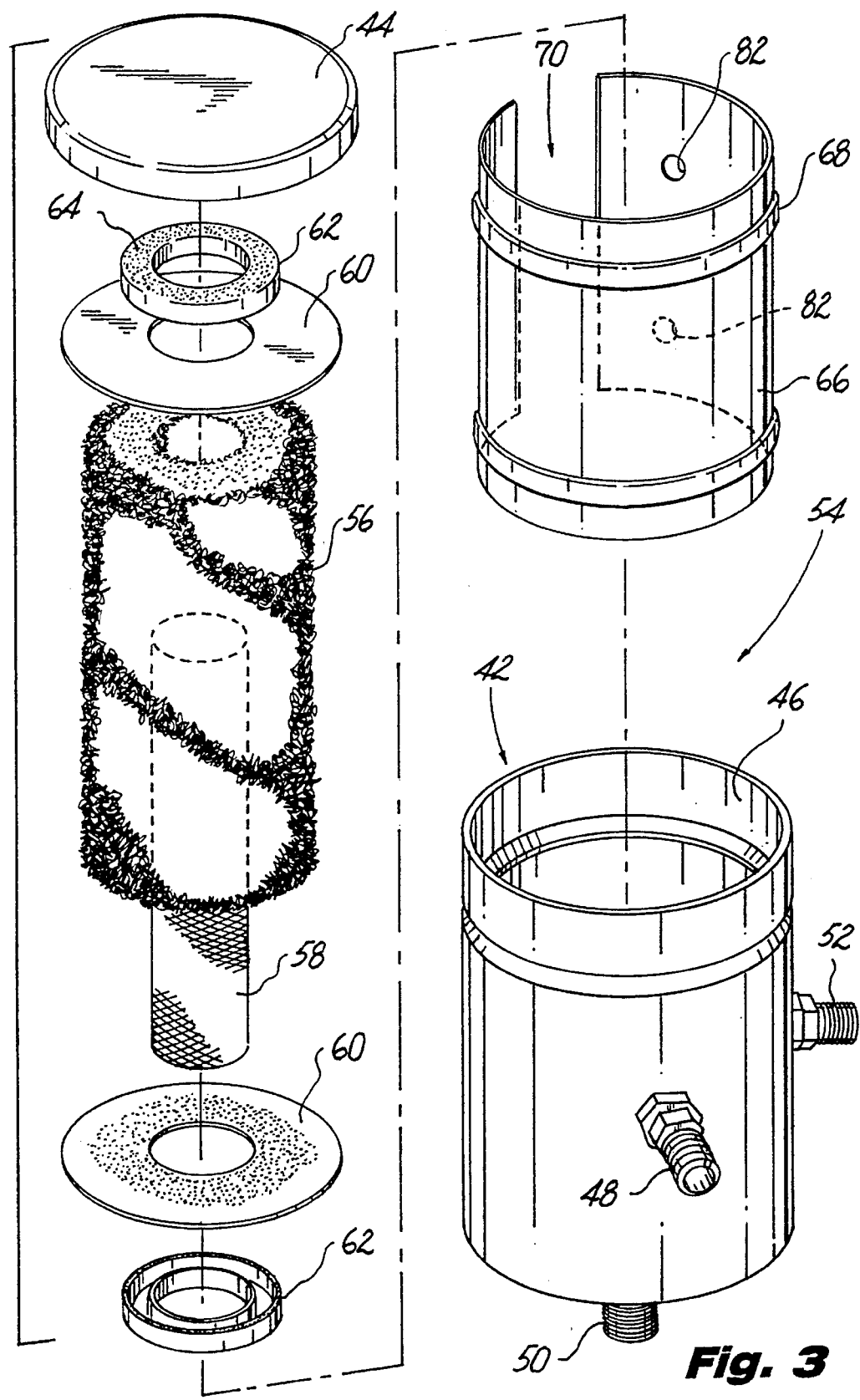
FIG. 3 is an exploded view of a first embodiment of the oil separator of the present invention, illustrating pictorially its various components.

As shown in FIGS. 2 and 3, the present invention provides an oil separator 38 comprising a housing in the form of a canister 40 closed at one end 44, provided with a removable, vacuum tight seal cap 44 at its other end, and having a smooth internal housing wall surface 46. An inlet 48 for the entrance of blow-by vapors which are channeled via conduit 36, and an outlet 50 for the discharge of cleansed blow-by vapors and air to the intake manifold 34 and a drainage port 52 with valve 53 for removal of condensed oil vapors are provided in the wall of the canister 40.

Preferably, the canister 40 is cylindrical in shape and is fabricated from a high-strength, non-corrosive steel material. However, it is understood by those skilled in the art that other configurations and materials are suitable for the canister 40 without departing from the spirit and scope of the invention. As will be described functionally later, the inlet 48 is set off at 90° from the drainage port 52, in the circumferential wall, while the outlet 50 extends along the center axis of the canister from the bottom wall 42.

Figure 4:
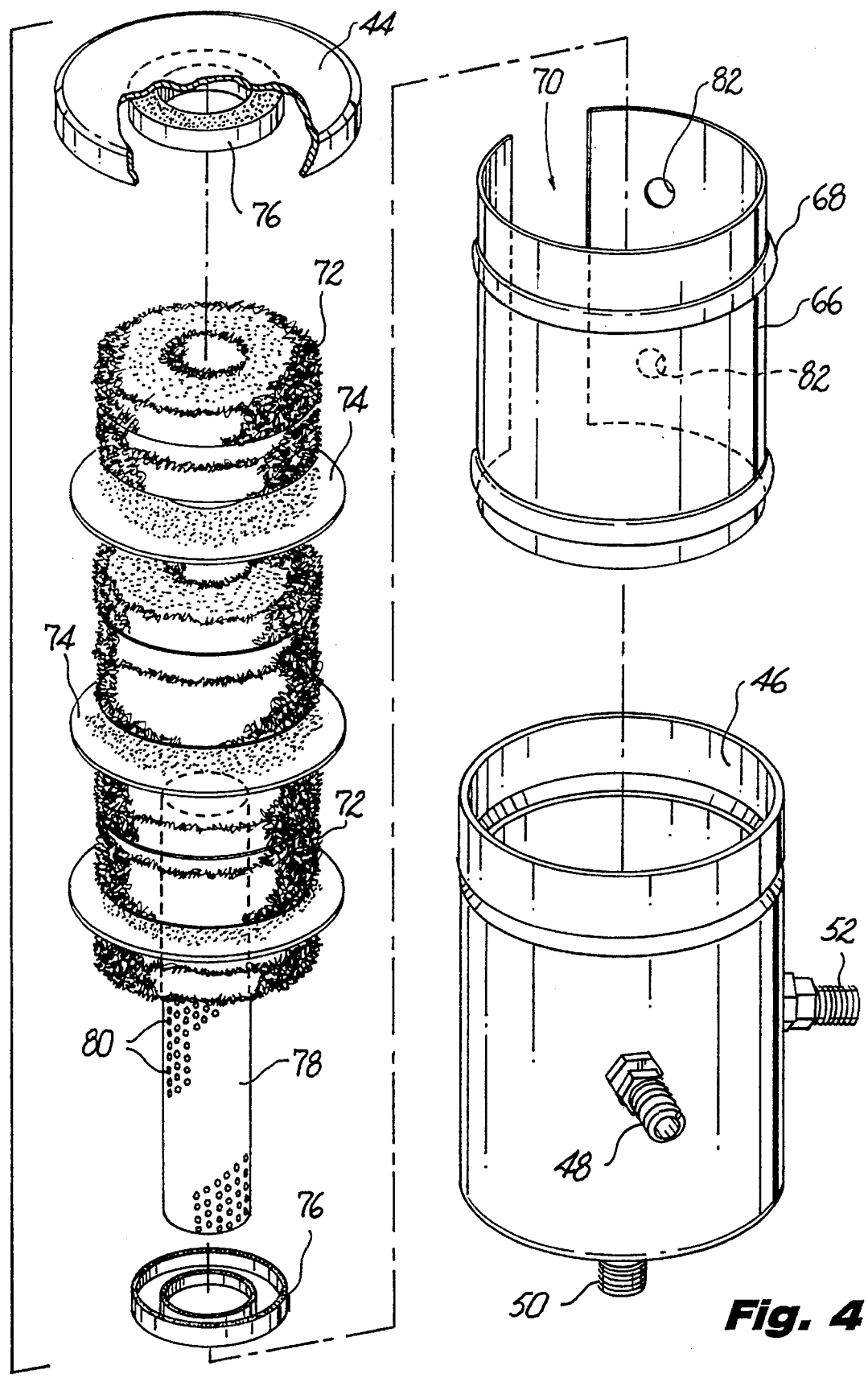
FIG. 4 is an exploded view of a second embodiment of the oil separator of the present invention, illustrating pictorially its various components.

Mounted within the canister, as seen in FIGS. 3 and 4 is a filter stack 54 for separating the oil vapors from the blow-by vapors. In the embodiment seen in FIG. 3, the filter stack 54 comprises a generally tubular filter body 56 of unitary construction mounted on a porous, tubular core 58. The filter stack is formed of material which is permeable to gas but impermeable to oil. Preferably, the filtering material is wool although other filtering materials such as felt or any other material which is permeable to air but offers resistance to the through-flow of oil is suitable. In the embodiment of FIG. 3, the core 58 is a wire screen of a mesh selected to permit the blow-by gases to flow freely therethrough. Alternatively, the core 58 may be a cylindrical hollow tube of metal or plastic material provided with a predetermined number of evenly spaced apertures, as will be seen from FIG. 4.

The ends of the filter body 56 are closed by an annular sealing disk 60 which closes the end of tubular core 58 and which is provided with an annular cup-shaped gasket or ring 62 which is glued or adhered, as at 64, to the cap 44 and the closed wall 42 to securely seal and maintain the filter body 56 fixed in place. The disk 60 is radially enlarged plate which abuts flat against the ends of the filter body 56 at both ends to thus compress together the filter material.

The filter body 56 is surrounded by a split sleeve 66 which is held fixedly in cylindrical form by one or more cinches or bands 68 tight against the edges and of the disks 60 so as to be spaced from the filter body 56. The sleeve 66 does not fully surround the filter body 56 and its longitudinal edges define a slot 70 providing radial access to the filter body 56. The sleeve 66 is further provided with a plurality of weep holes 82 opposite the slot 70. The filter stack 54 is sized with a diameter slightly less than the inner diameter of the canister such that, upon insertion into the open end, the outer sleeve 66 is also spaced from the inner wall surface 46 of the canister, defining therebetween an annular flow passage. Thus, as the vapors are introduced through inlet port 48, they flow over both surfaces of the sleeve 66 and are condensed into liquid droplets.

The annular sealing disks 60, in compressing the filter body 56 to hold the split sleeve 66 away from the filter body 56 to maintain a relatively cooler sleeve surface for better condensation of vapors and forces flow outward over the filter stack 54 and sleeve 66 thus separating vapors and drawing cleansed air through the filter stack for final, second stage cleansing, and then through to the filter stack core shaft for discharge from outlet 50 into intake manifold 34. The disks 60 have a slightly larger diameter than the filter body 56.

The filter stack 54, when assembled with body and sleeve, is inserted within the canister and the canister cap 44, together with a filter seal 76, are force fit over the open end and secured by soldering or welding to the housing forming a vacuum tight seal. The filter stack is of such length that the cap 44 and filter seal 76 provide a compression fit longitudinally to hold the filter stack firmly within the canister. The canister wall may be provided with an abutment for limiting the depth of the cap within the housing or other means to orient the cap.

Preferably, the sleeve 66 and disks 60 are made from thin gauge aluminum sheet metal which inherently stays cooler and cools down faster. The retaining bands 68 may be metal or plastic ties or wire fastened together or welded. In addition, it will be appreciated that by bringing the cable or wire ends or weld into contact with the internal surface of the housing, a grounding means may be provided for the entire condenser grid against any static electricity that might accumulate. Ridding the condenser grid of this static electricity may greatly reduce the resistance of the natural vacuum and condensed oil flow over the sleeve.

In the embodiment shown in FIG. 4, which is basically of the same construction and where the same components are referenced by the same reference numerals as in FIG. 3, the filter body is formed of a plurality of filter sections 72 separated by annular metallic plates 74 to define a composite tubular body. In the embodiment of FIG. 4, three sections 72 and disks 74 are shown. However, it will be understood that additional sections may be provided. The separating disk 74 acts to stabilize the sleeve 66 and provide additional surface for condensation. Their numbers, of course, are not critical. Separate end seals in the form of small washers 76 are provided and glued or otherwise adhered to the end cap 44 and closed wall 42, since radial support at the ends is critical. As mentioned earlier, the filter sections 72 are mounted on a porous core 78, here shown as a solid tube with a plurality of holes 80 rather than being formed as a wire mesh.

The oil separator of the invention is arranged, as seen in FIG. 1, in the blow-by circuit in a similar manner to that shown in my aforementioned patent and its relationship with the engine is the same. However, the oil separator of the present invention is assembled so that when the filter stack 54 is inserted into the canister 40, the slot 70 in the sleeve 66 lies 180° from the inlet port 48. The pair of weep holes 82 are provided in the sleeve 66, offset about 90 degrees from the slot 70, in opposition to the oil discharge port 52. Thereby, when introduced into the canister, the polluted crankcase vapors impinge upon the outer surface of the sleeve 66 and a substantial amount of the oil in the vapors condense and drop down on to the inner wall surface 46 of the canister to be removed through the drainage port 52 which lies 90° from the inlet 48 and from the slot 70. Simultaneously, a vacuum is drawn through the outlet port 50 which, as noted earlier, is connected to the intake manifold 34 of the engine. The vacuum through outlet port 50 causes the vapors to flow through the annular passage about the outer surface of the sleeve 66 through the slot 70, between the inner wall surface of the sleeve 66 and the filter body 56 and thence through the filter material of the bodies 72 where the vapors are condensed and further cleansed of their pollutants. The cleansed vapors are then carried off through the core 58 (78) and the outlet port 50 while any oil condensing or falling onto the interior surface of the sleeve drops into the inner wall surface of the canister for removal through drainage port 52. To insure the gravitational flow of the condensed oil from the sleeve toward the drainage port, the assembled canister is preferably arranged within the blow-by circuit in horizontal position as shown in FIG. 1.

In addition to its use in the arrangement shown in FIG. 1, the oil separator 10 of the present invention may be used in several other ways. For example, it may be employed in an engine which was not manufactured with a crankcase return, and the oil drainage port 52 may be capped. The oil may then be stored in the housing until the filter stack needs to be replaced at which time the oil may be removed. As seen in FIG. 5, the canister wall may be provided with a bulge 84 in its bottom wall 46 about the drainage port 86 to collect the oil. A short length hose 88 may be attached to the drainage port and the oil accumulated therein. The hose 88 may be provided with a drainage cap 90 such as a nozzle or valve for periodic removal of the oil. Alternatively, the hose may be connected to a collection container directly on top of the PCV valve located on the engine rocker cover. The placement of the oil separating device in this manner allows for gravitational flow of the condensed oil vapors back through the PCV valve and into the crankcase during engine off periods when there is no vacuum pressure in the system.

From the foregoing description, it can be seen that the present invention comprises an improved oil separating device. It will be appreciated by those skilled in the art, that changes could be made to the embodiments described in the foregoing description without departing from the broad inventive concept thereof. It is understood, therefore, that this invention is not limited to the particular embodiments disclosed, but is intended to cover all modifications which are within the scope and spirit of the invention as defined by the appended claims.

What is claimed is:

1. Apparatus for separating oil from the blow-by exhaust vapors of a combustion engine comprising a canister having an inlet port for the intake of said vapors from the engine, a gas outlet port for connection to a source of suction for causing the vapors to be sucked through said canister from said inlet port, a discharge port for removal of condensed oil from said canister, and a hollow, cylindrical filter stack located in said canister and operatively arranged so that the vapors pass in contact and radially through the filter stack being sucked from the inlet to the gas outlet port, said filter stack comprising a filter body formed of material permeable to gas and impermeable to oil, a sleeve partially surrounding said filter body on which said vapors from said inlet port impinge and on which the oil in said vapors condense and a longitudinal opening diametrically opposite to the inlet port, and including a pair of seal caps secured to opposite ends of said canister, and an end closure compressed against said seal cap to provide an airtight seal at both ends of said canister comprising a pair of annular disks having a diameter greater than the diameter of said filter body, each of said disks being interposed between said filter body and a respective one of filter stack material ends such that said core extends through said disks, and retaining means securing said sleeve about said annular disks and in spaced enveloping relation to said filter body, said filter stack being mounted within said canister and spaced from the interior wall surface thereof to define an annular flow passage between said sleeve and the interior wall surface of said canister in which said oil in said vapors may collect prior to passage through said filter body.

2. The device according to claim 1, wherein said filter body member comprises a plurality of filter sections separated by annular plates and arranged in stacked relationship.

3. The device according to claim 1, wherein said core is a tubular wire mesh.

4. The device according to claim 1, wherein said core is a solid tube formed with a plurality of perforations.

5. The device according to claim 1, wherein said sleeve means comprises a thin sheet of metal, said sheet enveloping said cylindrical body member approximately three-quarters of the way around thereof to define a slotted opening.

6. The device according to claim 1, including a drainage port within said canister and valve means in series connection with said drainage port to close the same against through flow of oil during periods of engine operation, said engine oil pan being in series connection with said drainage port and said valve means to collect the condensed oil passing in series through said drainage port and valve means.

7. The device according to claim 1, wherein a portion of said internal surface of said canister, forms a sump to collect condensed oil to remain therein until discarded at the end of a predetermined period.

8. The device according to claim 1, including a drainage port within said canister and a container in series connection therewith to collect the condensed oil passing through said drainage port.

9. The device according to claim 1, including a drainage port within said housing and conduit means in series connection at a first end thereof with said drainage port to collect condensed oil passing through said drainage port, said conduit means including drainage means at a second end thereof for periodic draining of said condensed oil collected therein.

\* \* \* \* \*